(No Model.)
J. S. DETRICK.
FILTER.
No. 290,000. Patented Dec. 11, 1883.
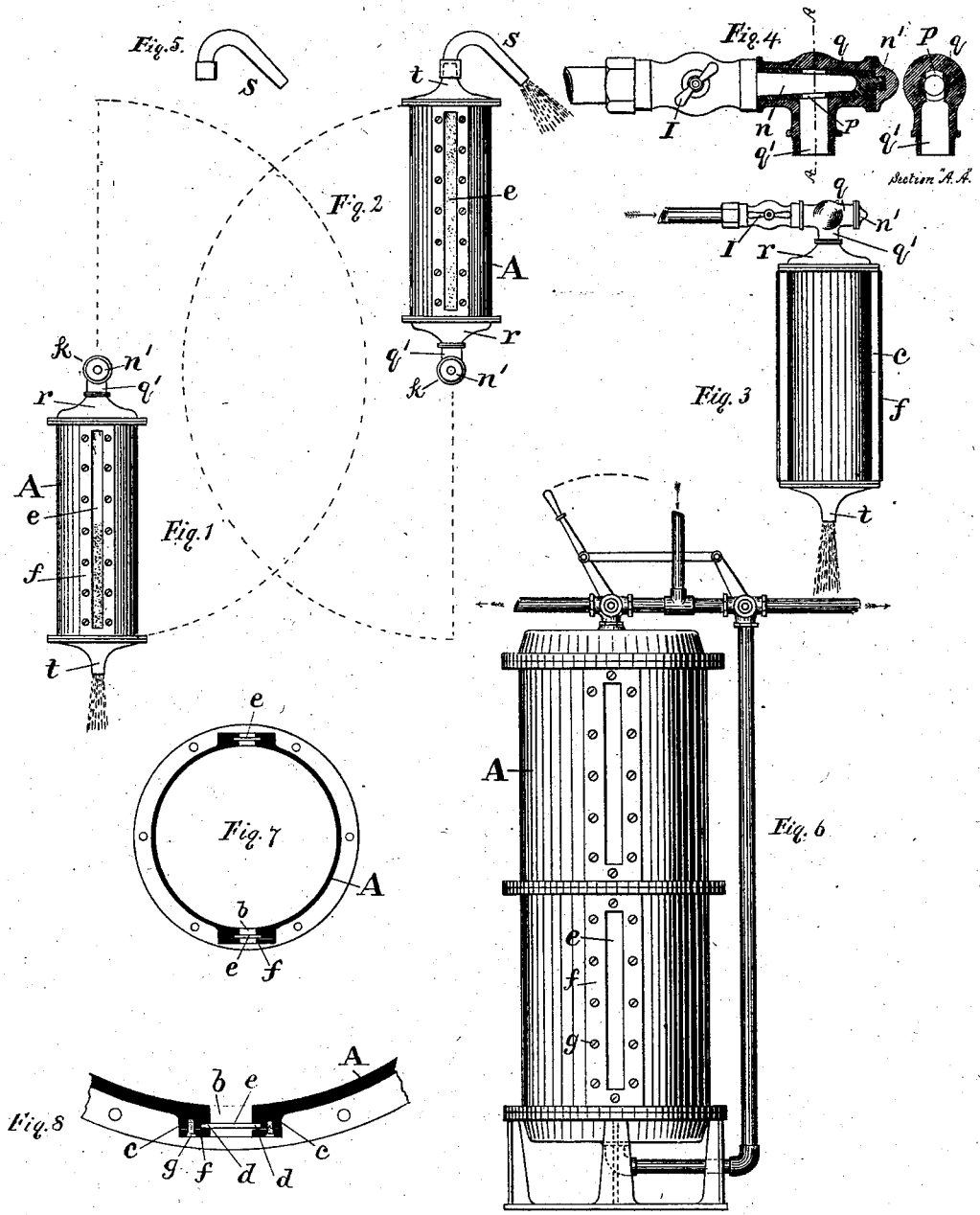
Witnesses:
A. C. Eader
John E. Morris
Inventor:
Jacob S. Detrick
By Chas. B. Mann
Attorney.

UNITED STATES PATENT OFFICE.

JACOB S. DETRICK, OF BALTIMORE, MARYLAND.

FILTER.

SPECIFICATION forming part of Letters Patent No. 290,000, dated December 11, 1883.

Application filed March 8, 1883. (No model.)

*To all whom it may concern:*

Be it known that I, JACOB S. DETRICK, a citizen of the United States, residing at Baltimore, in the State of Maryland, have invented certain new and useful Improvements in Filters, of which the following is a specification, reference being had therein to the accompanying drawings.

My invention relates to certain improvements in filters; and it consists of two features, to wit: first, providing the metal cylinder with an inspection-glass; second, pivoting that end of the cylinder at which the water enters, whereby, when the cylinder hangs suspended, the water will flow downward and be filtered, and when the cylinder is turned upward the filtering material will be loosened and the water will flow upward and cleanse the filter.

In the drawings hereto annexed, Figure 1 is a view of the spigot-filter hanging down, as when filtering. Fig. 2 is a view of same turned up, as when cleansing. Fig. 3 is a side view transverse to that seen in Figs. 1 and 2. Fig. 4 shows two views of the joint which constitutes the pivot by which the filter is attached to the spigot. Fig. 5 is a view of the gooseneck nozzle. Fig. 6 is a side view of a stationary filter, with the improved inspection-glass. Fig. 7 is a horizontal cross-section of the stationary filter. Fig. 8 is also a section view, enlarged scale.

The inspection-glass is particularly applicable to that class of filters exemplified by United States Letters Patent No. 232,735, dated September 28, 1880, where a space is left above the filtering material in a filter-compartment and the said material is loose or unconfined, whereby, when an upward current of fluid is entered into the filter-compartment, the filtering material will be loosened up and the water, flowing through it in this condition, will free it of all impurities. In large stationary filters of this description it has been found that upon suddenly reversing the fluid-current the entire mass of filtering material is liable to be raised bodily without breaking its bulk, and when this occurs the upward pressure of the fluid will keep the elevated mass intact, whereby, instead of the reversed current serving to free the material of impurities, the current is itself simply filtered. The trouble is that all this takes place in an iron case or cylinder without its occurrence being known. I remedy this difficulty by providing the metal wall of the cylinder with inspection-glasses, whereby the contents of the metal cylinder may be seen. If it is found on looking through the inspection-glass that, although reversed, the mass of filtering material has been raised bodily without loosening or separating, the lever which controls the cocks may be shifted and again slowly reversed, which will usually have the effect to loosen the material.

The letter A designates the metal cylinder or case of the filter. A slot, $b$, is formed and extends vertically in the wall of the cylinder or case. The metal of the cylinder is thickened, as at $c$, each side of the slot, and each side has a channel, $d$, in which the glass $e$ is placed. Any suitable packing may be employed to insure a water-tight fit of the glass. A slotted plate, $f$, is then placed over the glass and secured by screws $g$, which enter the thickened part. While one glass may suffice, the interior operation of the filter may be still more plainly visible by providing another inspection slot and glass on the diametrically-opposite side of the cylinder. Thus a person at one side may view the interior by the aid of the light on the opposite side of the filter. Should anything be wrong in the operation of the filter, it may thus readily be seen. It will be seen that this inspection-glass is alike applicable to stationary filters, and also to a filter pivoted, as shown in Figs. 1 and 3, by that end wherein the fluid enters.

The letter I designates a spigot or ordinary water-cock, and $k$ a joint connecting one end of the filter to the water-cock. The joint serves as a pivot or swivel whereby the filter may be turned in a vertical plane from its normal downward position, as in Fig. 1, to an upward position, as shown in Fig. 2, or may be turned entirely around. The construction of the joint or pivot may vary. In the present instance the projected end $n$ of the cock slightly tapers, and has two outlets, $p$, one above and one below. A tubular T-connection, $q$, fits on and is adapted to turn loosely around the tapered end, and is kept in place by the screw-nut $n'$. The projecting end $q'$ of the T-connection is screw-threaded, and thereby is attached to the head *r* of the filter. It will thus be understood that when the filter hangs down from the spigot, the tube end *q'* is in coincidence with the lower outlet *p* and in position for the water to be filtered, and when the filter is up, the tube end *q'* is in coincidence with the upper outlet *p* and in position for the water to cleanse the filter. When thus turned up, a goose-neck nozzle, *s*, may be employed, if desired, by slipping one end over the discharge-nozzle *t* of the filter. This goose-neck nozzle serves to direct the discharge of unclean water to one side of the filter, as shown in Fig. 2.

From the foregoing description the operation of the pivoted filter will be understood.

Having described my invention, I claim and desire to secure by Letters Patent of the United States—

1. A filter having its cylinder or case provided with a slot, and said slot closed by an inspection-glass, as set forth.

2. A filter having its cylinder or case provided on each of two diametrically-opposite sides, with an inspection-glass, as set forth.

3. A filter having its cylinder or case pivoted at the end where the water enters, and adapted to be turned in a vertical plane, as set forth.

In testimony whereof I affix my signature in presence of two witnesses.

JACOB S. DETRICK.

Witnesses:
 JNO. T. MADDOX,
 JOHN E. MORRIS.